(12) United States Patent
Lima

(10) Patent No.: US 11,780,535 B2
(45) Date of Patent: Oct. 10, 2023

(54) METHODS AND SYSTEMS FOR UNDERWATER APPLICATION OF STREAMER COATING ON GEOPHYSICAL STREAMERS

(71) Applicant: PGS Geophysical AS, Oslo (NO)

(72) Inventor: Jostein Lima, Oslo (NO)

(73) Assignee: PGS Geophysical AS, Oslo (NO)

( * ) Notice: Subject to any disclaimer, the term of this patent is extended or adjusted under 35 U.S.C. 154(b) by 456 days.

(21) Appl. No.: 17/105,086

(22) Filed: Nov. 25, 2020

(65) Prior Publication Data

US 2021/0188403 A1 Jun. 24, 2021

Related U.S. Application Data

(60) Provisional application No. 62/950,024, filed on Dec. 18, 2019.

(51) Int. Cl.
 *B63B 21/66* (2006.01)
 *G01V 1/20* (2006.01)

(52) U.S. Cl.
 CPC .............. *B63B 21/66* (2013.01); *G01V 1/201* (2013.01)

(58) Field of Classification Search
 CPC ........ B63B 21/66; B63B 59/06; G01V 1/201; G01V 13/00
 See application file for complete search history.

(56) References Cited

U.S. PATENT DOCUMENTS

| | | | |
|---|---|---|---|
| 6,580,661 B1 | 6/2003 | Marschall et al. | |
| 7,409,919 B2* | 8/2008 | Hoogeveen | G01V 1/201 |
| | | | 134/6 |
| 8,960,117 B2 | 2/2015 | Nielsen et al. | |
| 9,116,253 B2 | 8/2015 | Stenzel et al. | |
| 9,377,560 B2 | 6/2016 | MacQuin et al. | |
| 9,494,708 B2 | 11/2016 | Le Roux et al. | |
| 9,933,547 B2 | 4/2018 | Macquin et al. | |
| 2004/0211818 A1 | 10/2004 | Ohtsuki et al. | |
| 2006/0144286 A1 | 7/2006 | Baum | |
| 2011/0174207 A1 | 7/2011 | Harrick et al. | |
| 2014/0033962 A1 | 2/2014 | MacQuin et al. | |
| 2018/0321032 A1* | 11/2018 | Vasbø | B05D 1/26 |

FOREIGN PATENT DOCUMENTS

| | | |
|---|---|---|
| EP | 2775326 A2 | 9/2014 |
| EP | 3399351 A1 | 11/2018 |
| WO | 9714752 | 4/1997 |

OTHER PUBLICATIONS

Great Britain Search Report and Written Opinion for Application No. GB2020028.3 dated Apr. 28, 2021.

* cited by examiner

*Primary Examiner* — Andrew Polay

(57) ABSTRACT

Embodiments relate generally to marine geophysical surveying. More particularly, embodiments relate to an underwater application system for application of a streamer coating to a surface of a streamer. An embodiment may comprise a marine geophysical survey system. The marine geophysical survey system may comprise a streamer and an underwater application system operable to apply a streamer coating to the streamer as the underwater application system travels axially along the streamer.

21 Claims, 7 Drawing Sheets

METHODS AND SYSTEMS FOR UNDERWATER APPLICATION OF STREAMER COATING ON GEOPHYSICAL STREAMERS

CROSS-REFERENCE TO RELATED APPLICATIONS

The present application claims priority to U.S. Provisional Application No. 62/950,024, filed Dec. 18, 2019, the entire disclosure of which is incorporated herein by reference.

BACKGROUND

Techniques for marine geophysical surveying include seismic surveying and electromagnetic surveying, in which geophysical data may be collected from below the Earth's surface. Geophysical surveying has applications in mineral and energy exploration and production to help identify and monitor locations of hydrocarbon-bearing formations. Certain types of marine geophysical surveying, such as seismic or electromagnetic surveying, may include towing an energy source at a selected depth—typically above the seafloor—in a body of water. One or more streamers may also be towed in the water at selected depths—typically above the seafloor—by the same or a different vessel. The streamers are typically cables that include a plurality of sensors disposed thereon at spaced apart locations along the length of the cable. Some geophysical surveys locate sensors on ocean bottom cables or nodes in addition to, or instead of, streamers. The energy sources may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition, and fluid content, thereby providing information useful in the recovery of hydrocarbons.

Unfortunately, marine organisms may adhere to and then grow on nearly everything that is placed in water for extended periods of time, including marine geophysical sensor cables, such as towed streamers or ocean-bottom cables. For convenience, any such marine geophysical sensor cable will be referred to herein as a "streamer." A streamer may include a marine streamer that comprises seismic sensors, electromagnetic sensors, or any combination thereof.

Marine growth (also known as biofouling) often refers to barnacle growth but is intended to also include the growth of mussels, oysters, algae, bacteria, tubeworms, slime, and other marine organisms. This marine growth is particularly problematic with streamers as the marine growth can increase drag resistance of the streamer, leading to increased fuel costs and/or reduced production speed. An additional problem with marine growth includes reduced data quality due to increased noise in the recorded data.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine geophysical surveying. More particularly, embodiments relate to an underwater application system for application of a streamer coating to a surface of a streamer. The streamer coating can be applied to the streamer while the streamer is disposed underwater. The underwater application system may also be at least partially underwater during application of the streamer coating to the streamer. The streamer coating may protect the streamer by preventing marine growth, which would otherwise negatively interfere with streamer operation. Accordingly, by application of the streamer coating, operation of the streamer in marine surveying may be improved.

Figure 1:
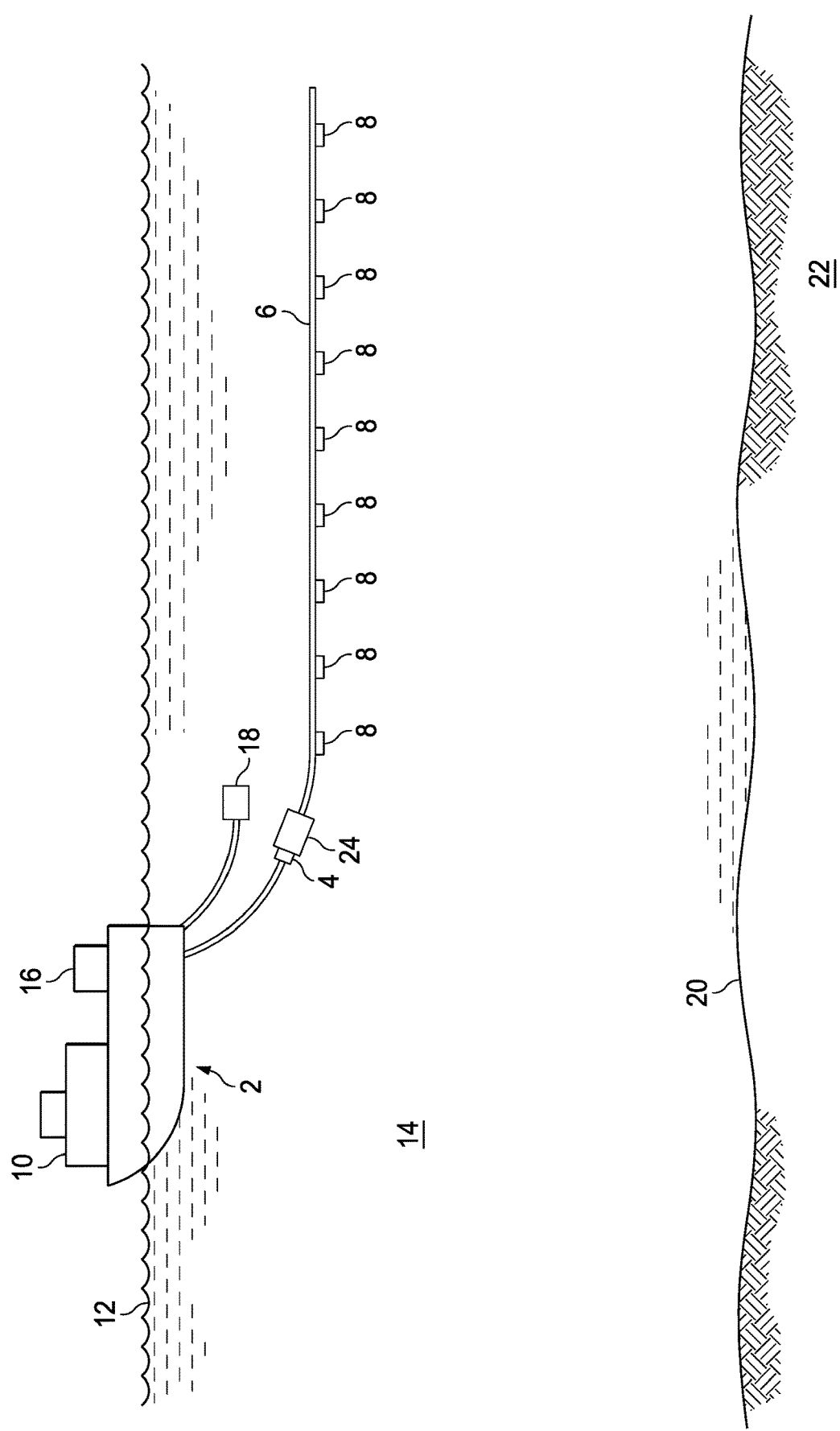
FIG. 1 illustrates an embodiment of a marine seismic survey that employs an underwater application system.

Referring now to FIG. 1, a marine geophysical survey system 2 that employs an underwater application system 4 is illustrated in accordance with embodiments of the disclosure. As will be discussed in more detail below, in some embodiments, the underwater application system 4 may be operable to apply a streamer coating to a streamer 6. The streamer 6 may include a long cable (or other elongated structure) on which geophysical sensors 8 may be disposed at spaced apart locations along the length of the streamer 6. In some embodiments, the marine geophysical survey system 2 may include a plurality of underwater application systems 4 configured to apply the streamer coating to a plurality of streamers 6. The streamer coating may be any substance configured to limit marine growth on the streamer. The streamer coating may include an animal wax, a plant wax, a petroleum wax, a polyethylene wax, or some combination thereof. In some embodiments, the streamer coating includes lanolin.

In the illustrated embodiment, the marine geophysical survey system 2 may include a survey vessel 10 to which the plurality of streamers may be coupled. The survey vessel 10 may move along a surface 12 of a body of water 14, such as a lake or ocean. The survey vessel 10 may include thereon equipment, shown generally at 16 and collectively referred to herein as a "recording system." Recording system 16 may include computers or devices (e.g., storage devices, microprocessors, etc. (none shown separately)) for detecting and making a time indexed record of signals generated by each of geophysical sensors 8 (explained further below) and for actuating energy source 18 at selected times. The recording system 16 may also include devices (none shown separately) for determining the geodetic position of survey vessel 10 and various geophysical sensors 8.

In some embodiments, the survey vessel 10 or another vessel may tow the at least one streamer 6 on which the geophysical sensors 8 may be disposed. As illustrated, the energy source 18 and the at least one streamer 6 may be towed above a water bottom 20. The at least one streamer 6 may be a towed marine seismic streamer, a towed marine electromagnetic streamer, or a combination thereof. While not shown, some marine seismic surveys locate the geophysical sensors 8 on ocean bottom cables or nodes in addition to, or instead of, the streamer 6. As illustrated, geophysical sensors 8 may be disposed at spaced apart locations on the streamer 6. The geophysical sensors 8 may be, without limitation, seismic sensors such as geophones, hydrophones, or accelerometers, or electromagnetic field sensors, such as electrodes or magnetometers. The geophysical sensors 8 may generate response signals, such as electrical or optical signals, in response to detecting energy emitted from energy source 18 after the energy has interacted with formations 22 below water bottom 20. In some embodiments, more than one streamer 6 may be towed by the survey vessel 10 or another vessel, and streamers 6 may be spaced apart laterally, vertically, or both laterally and vertically. The detected energy may be used to infer certain properties of the subsurface rock, such as structure, mineral composition, and fluid content, thereby providing information useful in the recovery of hydrocarbons and/or minerals.

In accordance with embodiments, a geophysical data product may be produced. The geophysical data product may include geophysical data and may be stored on a non-transitory, tangible, computer-readable medium. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States or another country. Once onshore, geophysical analysis, including further data processing, may be performed on the geophysical data product.

In some embodiments, the underwater application system 4 may be operable to apply the streamer coating to the streamer 6 while the streamer is being towed by the survey vessel. The underwater application system 4 may travel along the streamer 6 to apply the streamer coating. In some embodiments, the underwater application system 4 may be coupled to a streamer cleansing unit 24 ("SCU 24") configured to travel along the streamer 6. The SCU 24 may be configured to scrape or clean marine growth from the streamer 6 as the SCU 24 travels along the streamer 6. In some embodiments, the underwater application system 4 may be configured to apply the streamer coating to the streamer 6 after the SCU 24 has scraped or cleaned the marine growth from the streamer 6. The streamer coating may be applied to streamer 6 using any suitable technique, including, but not limited to, spray nozzles, brushes, etc.

Figure 2A:
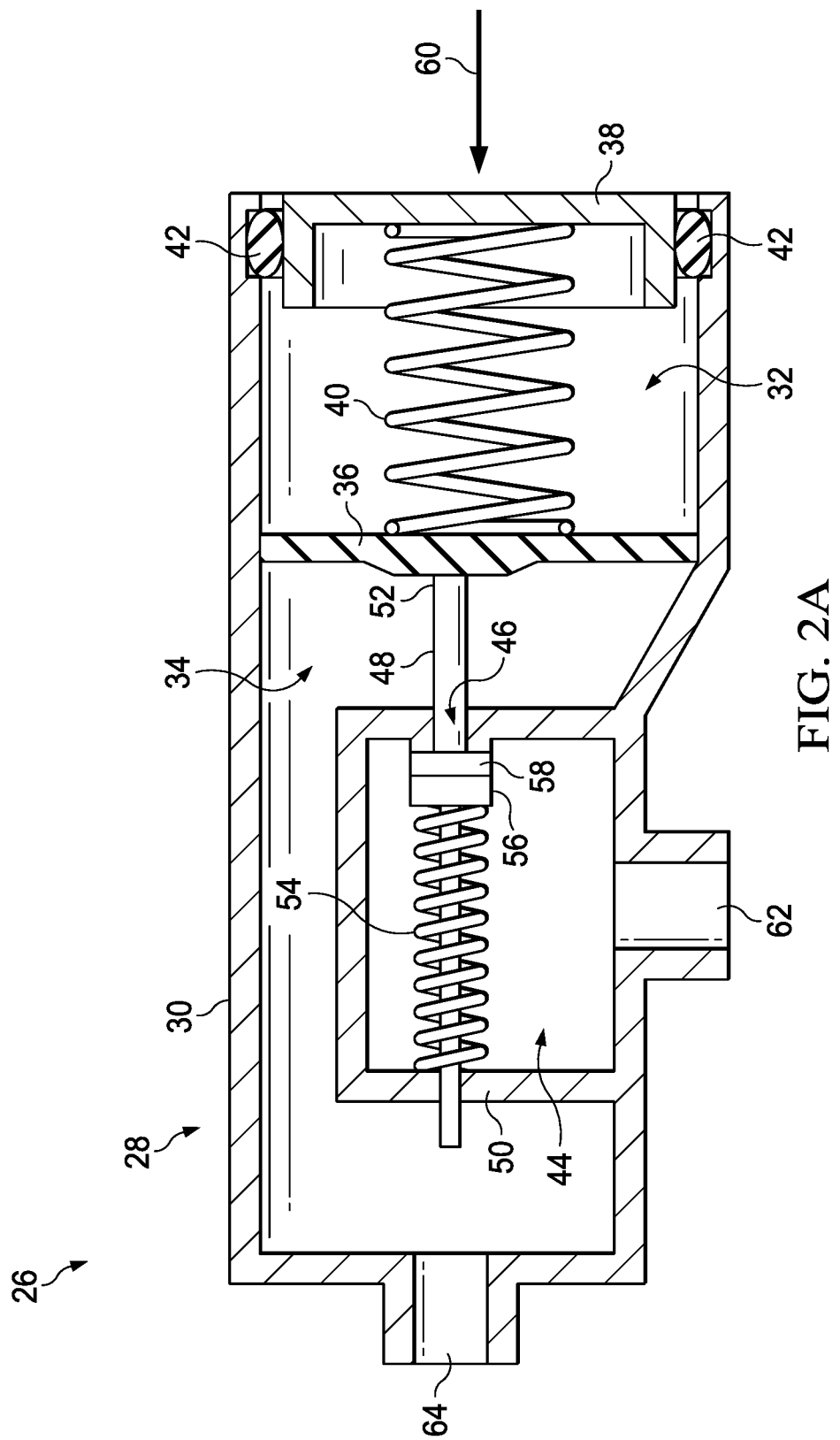
FIG. 2A illustrates an embodiment of a control system of the underwater application system that includes a mechanical valve.

FIG. 2A illustrates an exemplary automated control system 26 of the underwater application system (e.g., the underwater application system 4 as shown on FIG. 1), in accordance with some embodiments of the present disclosure. The control system 26 may include a regulator or valve 28 configured to regulate flow of the streamer coating through the underwater application system based on a depth and/or movement of a streamer (e.g., a streamer 6 as shown on FIG. 1). The valve 28 may open and close based on ambient pressure (e.g., hydraulic pressure) in a body of water and may not require user intervention. The valve 28 is a non-limiting example of the control system 26 and other suitable regulators, valves, and/or control systems may be utilized, as should be understood by one having skill in the art, with the benefit of this disclosure.

In some embodiments, the control system 26 may be configured to cause the underwater application system to activate (e.g., dispense a coating or film) based at least in part on movement of the underwater application system. As illustrated, the valve 28 may include a body 30 that may include a first chamber 32 and a second chamber 34 that are separated by a diaphragm 36. The diaphragm 36 may be made of a flexible material such as rubber or plastic, that may move based on ambient water pressure. An outer, movable, and rigid portion 38 of the body 30 may be attached to or in contact with a spring 40 that may be disposed within the first chamber 32. The spring 40 may extend between and contact the portion 38 and the diaphragm 36. The first chamber 32 and the second chamber 34 may be sealed (e.g., from sea water). In some embodiments, seals 42 such as O-ring(s) may be disposed around the portion 38.

A third chamber 44 may be disposed within the second chamber 34. The second chamber 34 may be in fluid communication with the third chamber 44 via a passage 46 disposed between the second chamber 34 and the third chamber 44. A plug or sealing member 48 may extend from the third chamber 44 to the second chamber 34. As illustrated, the sealing member 48 may extend through the passage 46 from a wall 50 of the third chamber 44. A distal end 52 of the sealing member 48 may contact the diaphragm 36. The sealing member 48 may extend through a spring 54 that extends from the wall 50 to the passage 46. The spring 54 may include an end cap 56 that abuts a flange 58 of the sealing member 48. The spring 54 may be compressed between the flange 58 and the wall 50 of the third chamber 44. The flange 58 may seal against the passage 46. In some embodiments, ambient water pressure (e.g., a threshold pressure) indicated by directional arrow 60 may cause the portion 38 to move inward to compress and cause the spring 40 to push against the diaphragm 36. The ambient water pressure may depend on depth and/or movement of the underwater application system 4 and/or the streamer 6. As the diaphragm 36 is pushed inward or flexes, the flange 58 of the sealing member 48 is moved away from the passage 46 thereby compressing the spring 54 in the third chamber 44 against the wall 50 and allowing a pressurized fluid that enters the third chamber 44 via an inlet 62 to enter the second chamber 34 through the passage 46. The inlet 62 may be coupled to a high-pressure source, tank, or vessel, for example. The pressurized fluid may exit the second chamber 34 via an outlet 64 which may be coupled to a dispensing device, in some embodiments. When the ambient water pressure is below a threshold pressure, the springs 40 and 54 may expand to their initial uncompressed or expanded configuration to close the passage 46 and prevent any fluid in the third chamber 44 from passing to the second chamber 34. It should be noted that stiffness of the springs may be chosen depending on a desired depth (e.g., a predetermined depth) of operation or velocity of the survey vessel 10 or environmental conditions at sea. For example, a stiffer spring may be utilized for depths with greater pressures, whereas less stiff springs may be utilized for shallower depths with lesser pressures. The valve 28 may allow the underwater application system 4 (e.g., shown on FIG. 1) to dispense the streamer coating in response to the underwater application system moving along the streamer and/or reaching a threshold ambient water pressure or depth.

As previously noted, the valve 28 is a non-limiting example of the control system 26 and other suitable regulators, valves, or control systems may be utilized, as should be understood by one having skill in the art, with the benefit of this disclosure. In some embodiments, the valve 28 may be replaced with an electromechanical valve such as a solenoid valve.

Figure 2B:
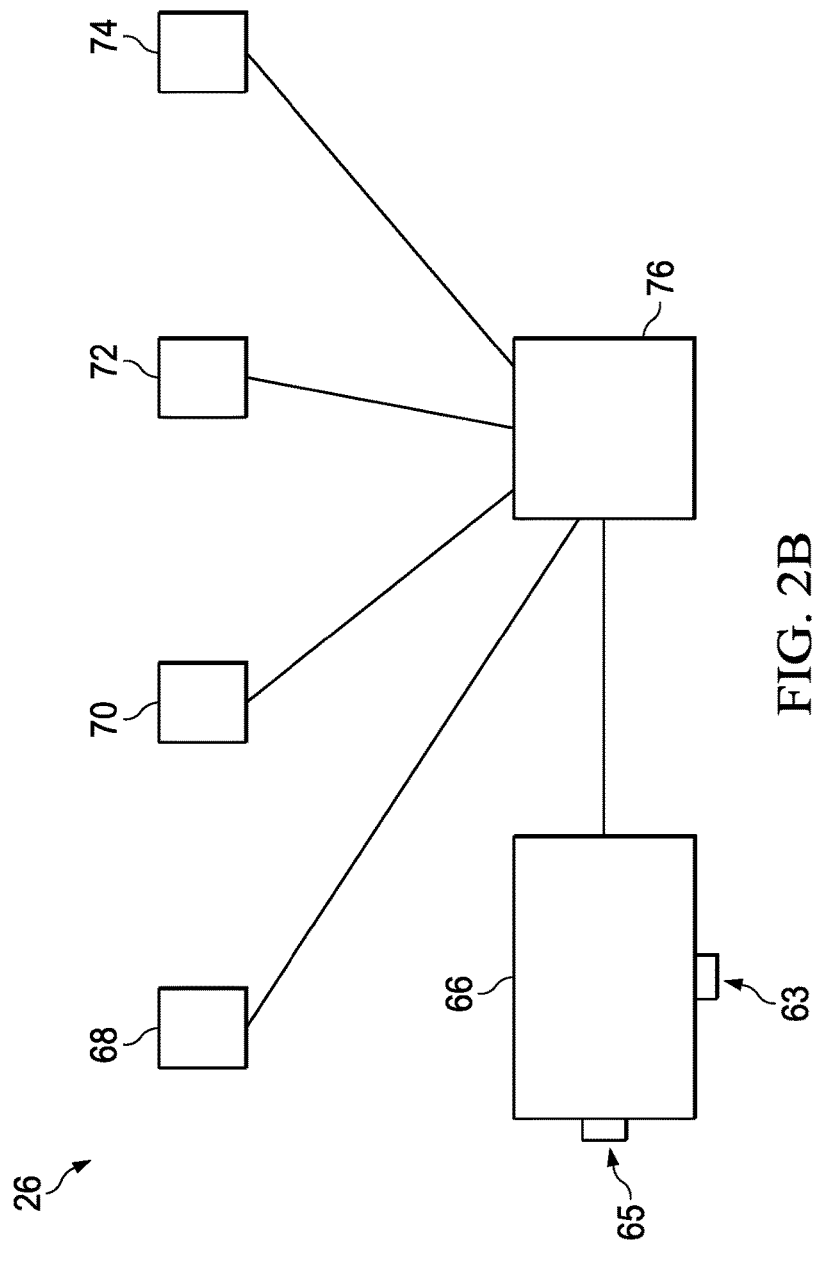
FIG. 2B illustrates an embodiment of the control system of the underwater application system that includes an electromechanical valve.

FIG. 2B illustrates the control system 26 including an electromechanical valve 66, in accordance with some embodiments of the present disclosure. The electromechanical valve 66 may be in communication (e.g., wires or wireless) with a motion detector 68, depth gauge 70, pressure sensor 72, and/or speed sensor 74. The electromechanical valve 66 may pass fluid via an inlet 63 and an outlet 65. In some embodiments, the inlet 63 may be coupled to a high-pressure source, tank, or vessel. The outlet 65 may be coupled to a dispensing device, for example. The electromechanical valve 66 may be configured to open or close based on detected motion, depth, pressure, and/or speed measurements. In certain embodiments, a computer 76 that is in communication with the electromechanical valve 66 and associated sensor components (e.g., the motion detector 68, the depth gauge 70, the pressure sensor 72, and/or the speed sensor 74), may be programmed to open or close the electromechanical valve 66 based on threshold values for motion detection, depth, pressure, and/or speed, thereby dispensing the streamer coating. The computer 76 may be disposed on the SCU 24 or on the underwater application system 4, as shown on FIG. 1, for example. The computer 76 may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). In some embodiments, the memory is configured to store controller instructions executable by the processor to output various control system signals. For example, the processor may execute the controller instructions to activate the underwater application system 4 by opening or closing the electromechanical valve 66.

Figure 3:
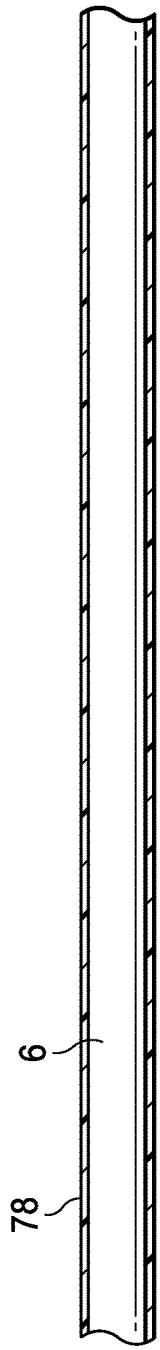
FIG. 3 illustrates an embodiment of a streamer coating on a streamer.

FIG. 3 illustrates the streamer 6 with the streamer coating 78, in accordance with some embodiments of the present disclosure. As previously described, the streamer coating 78 may be applied to streamer 6 while the streamer is towed by the survey vessel. The streamer coating 78 may also be applied to streamer components (not shown), such as position control devices that include one or more wings, for example. The streamer coating 78 may have any suitable thickness based on a number of factors, including, but not limited to, water temperature, type of streamer coating, and travel speed of the underwater application system along the streamer. In some embodiments, the streamer coating 78 may have a thickness of about 0.01 millimeter to about 1 millimeter. It should be understood that the present embodiments should not be limited to the disclosed range for thickness of the streamer coating 78, but rather, in some embodiments, the streamer coating 78 may have a thickness outside of this range.

Figure 4:
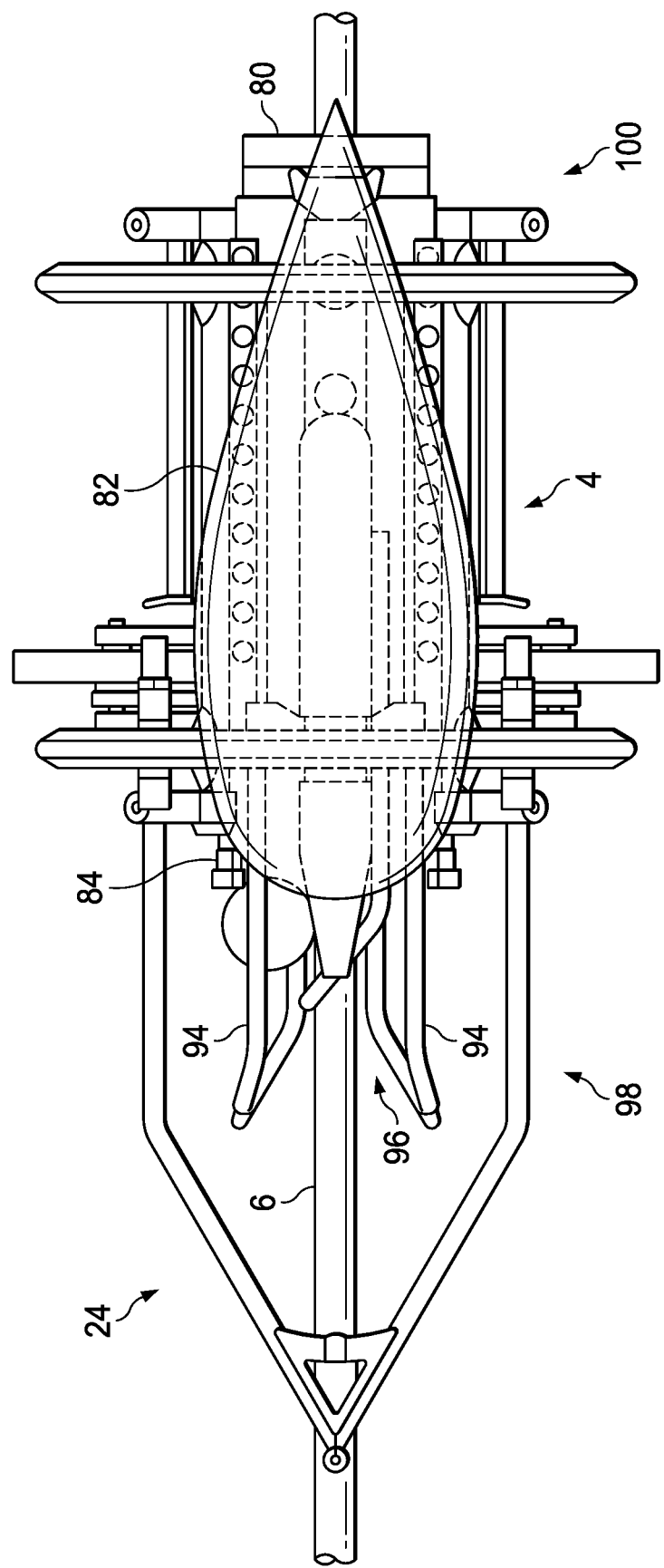
FIG. 4 illustrates a top view of an embodiment of the underwater application system coupled to a streamer cleaning unit (SCU).
Figure 5:
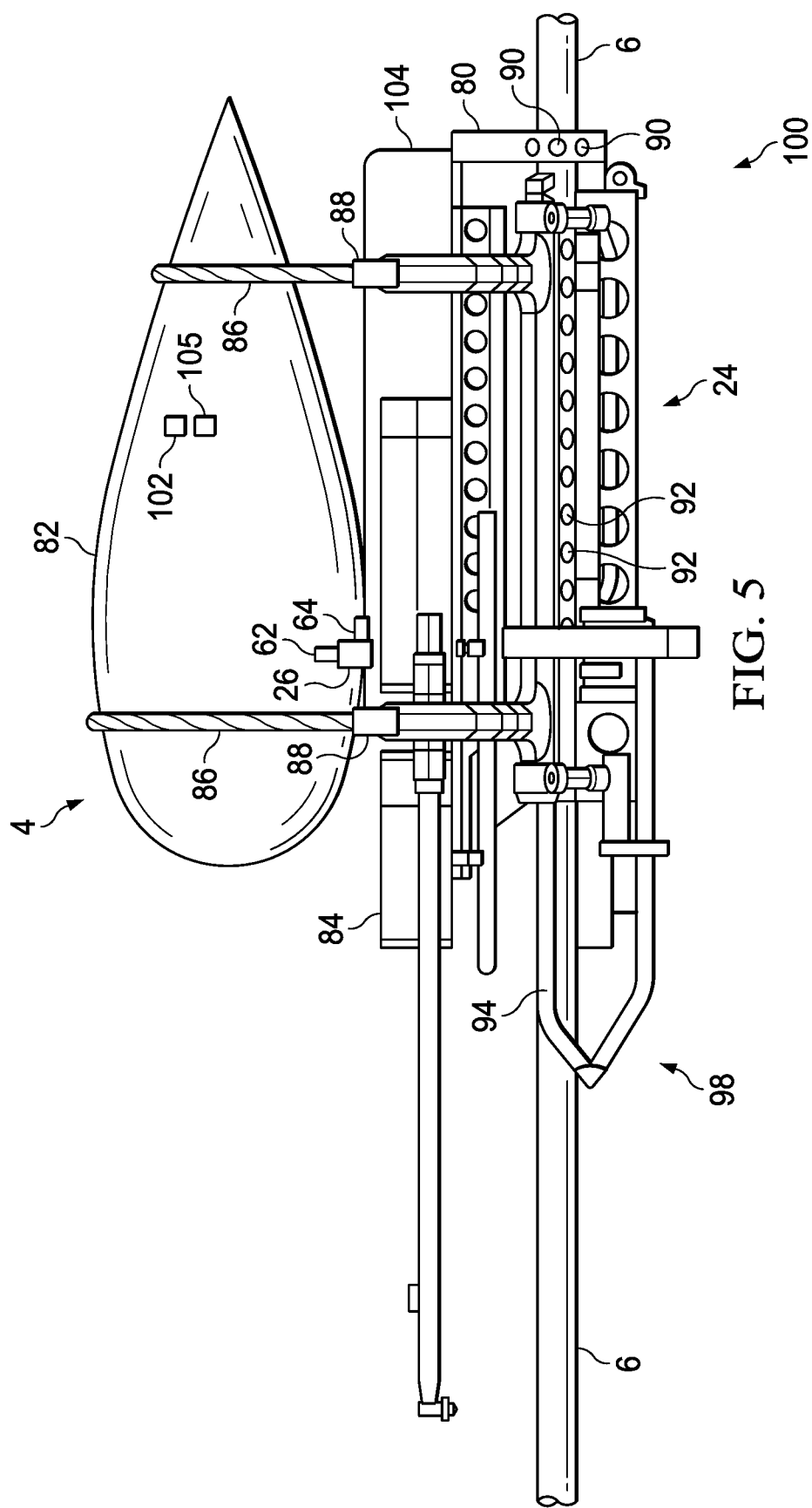
FIG. 5 illustrates a side view of an embodiment of the underwater application system coupled to the SCU.

FIGS. 4 and 5 illustrate a top view and a side view, respectively, of an embodiment of the underwater application system 4. As illustrated, the underwater application system 4 may be disposed along the streamer 6 that is towed by the survey vessel 10 (e.g., shown on FIG. 1). The underwater application system 4 may at least include a dispensing device 80 in fluid communication with a tank 82 configured to provide the streamer coating 78 (e.g., shown on FIG. 3) to the dispensing device 80. The dispensing device 80 may be coupled (e.g., welded) to the housing 84 of the SCU 24. The tank 82 may include any suitable vessel for providing the streamer coating 78, such as a pressure vessel or pressurized tank. The tank 82 may be hydrodynamically shaped and may be mounted to any portion of the SCU 24. The SCU 24 may be secured to the underwater application system 4. For example, the SCU 24 may be secured to the underwater application system 4 via the straps 86. By of further example, the tank 82 may be coupled or secured to a frame or the housing 84 of the SCU 24 via straps 86 (e.g., made of a polymer) extending around the tank 82 and coupled to the housing 84 via a buckle or ratcheting device 88, as shown on FIG. 5.

In some embodiments, the dispensing device 80 includes a plurality of nozzles 90, as shown on FIG. 5. The plurality of nozzles 90 may be configured to direct the streamer coating 78 onto the streamer 6. The nozzles 90 may be positioned proximate a plurality of cleaning elements such as scrapers 92 of the SCU 24 such that the nozzles 90 may apply the streamer coating after the SCU 24 cleans the streamer 6. The plurality of scrapers 92 may be coupled to the housing 84. The plurality of nozzles 90 may be arranged in any suitable configuration. In some embodiments, there may be six or more nozzles 90 arranged around the streamer 6 so that streamer coating 78 (e.g., shown on FIG. 3) may be evenly distributed on streamer 6 (or as evenly as practical). However, in some embodiments, the plurality of the nozzles 90 may include less than six nozzles. In some embodiments, the plurality of nozzles 90 forms multiple rings that are axially offset from each other along an axial direction with respect to the underwater application system 4. Further, the nozzles 90 may be evenly spaced around the streamer 6 to apply the streamer coating 78 evenly along a circumference of the streamer 6. However, in some embodiments, the nozzles 90 are unevenly spaced around the streamer 6 to accommodate any streamer components disposed along the streamer 6.

As previously noted, the scrapers 92 may be attached to the housing 84. In certain embodiments, the scrapers 92 may be disposed along a passage 96 of the underwater application system 4. As the streamer 6 passes through the passage 96, the scrapers 92 scrape or remove impurities (e.g., barnacles) from the streamer 6, and then the nozzles 90 may apply the streamer coating 78 (e.g., shown on FIG. 3) to the streamer 6.

In certain embodiments, the SCU 24 may include guide bars 94 (e.g., streamer guides) to guide the streamer 6 through the passage 96. The guide bars 94 may be disposed on opposing sides of the passage 96 and may extend along a length of the passage 96, as shown on FIG. 4. The guide bars 94 may be smooth members that taper inward toward the passage 96. In some embodiments, the guide bars 94 may be disposed on or extend from a first end 98 of the housing 84 of the SCU 24. The dispensing device 80 may be disposed on a second end 100 of the housing 84 that is opposite to the first end 98. The guide bars 94 do not restrict rotational movement of the SCU 24 around the streamer 6. Therefore, in some embodiments, the SCU 24 freely rotates around the streamer 6 as the SCU 24 traverses the length of the streamer 6.

As shown on FIG. 5, the tank 82 may include the control system 26 or may be in fluid communication with the control system 26. The tank 82 may also include an intake or a filler valve 102 to fill the tank 82 with desired substances or mixtures to be dispensed (e.g., the streamer coating 78). The control system 26 may be placed downstream of the tank 82 (e.g., the inlet 62 of the control system 26 may pass contents of the tank 82 through the control system 26) and may release pressurized contents contained within the tank 82 via the outlet 64 of the control system 26 and a conduit 104 (e.g., a fluid connection) extending from the control system 26 to the dispensing device 80. In some embodiments, the tank 82 may be configured to receive an amount of streamer coating configured to coat an entire axial length of the streamer. Further, the tank 82 may be filled with compressed gas via the filler valve 102. In some embodiments, the tank 82 includes an additional air filler valve 105, such that pressurized gas and the streamer coating 78 may be input into the tank 82 via separate valves.

The tank 82 may contain the streamer coating 78 which may include thermoplastic polymers, such as polyurethane, polypropylene, polyamides, waxes, and combinations thereof. In some embodiments, the streamer coating 78 may be a wax composition that includes wax and one or more additional materials, such as a solvent. By way of example, the wax composition may comprise lanolin wax and lanolin alcohol. Suitable solvents may include alcohols and oleaginous fluids. Non-limiting examples of suitable oleaginous liquids may include organic oils (e.g., vegetable oils) or synthetic oils. Suitable waxes may include, but are not limited to, animal waxes, plant waxes, petroleum waxes, polyethylene waxes, and combinations thereof. Animal waxes may include waxes synthesized by animals (including insects) as well as chemically modified versions thereof. Plant waxes may include waxes synthesized by plants as well as chemically modified versions thereof. Petroleum waxes may include waxes derived from petroleum. Polyethylene waxes may include waxes derived from polyethylene. Specific examples of suitable waxes may include, but are not limited to, cocoa butter, illipe butter, lanolin, cetyl palmitate, bayberry wax, lanolin alcohol, paraffin wax, silicone wax, and sumax wax, among others. The wax composition may be selected with a melting point that is around water temperature. In some embodiments, the wax composition may have a melting point within about 2° C., about 5° C., or about 10° C. of water temperature. In certain embodiments, the tank 82 may also include pressurized gas to propel contents from the tank 82 and out through the dispensing device 80 onto the streamer 6. The pressurized gas may include air, nitrogen, or carbon dioxide, or other suitable gas. One of ordinary skill in the art with the benefit of this disclosure should be able to determine an appropriate gas to use for a particular application.

Figure 6:
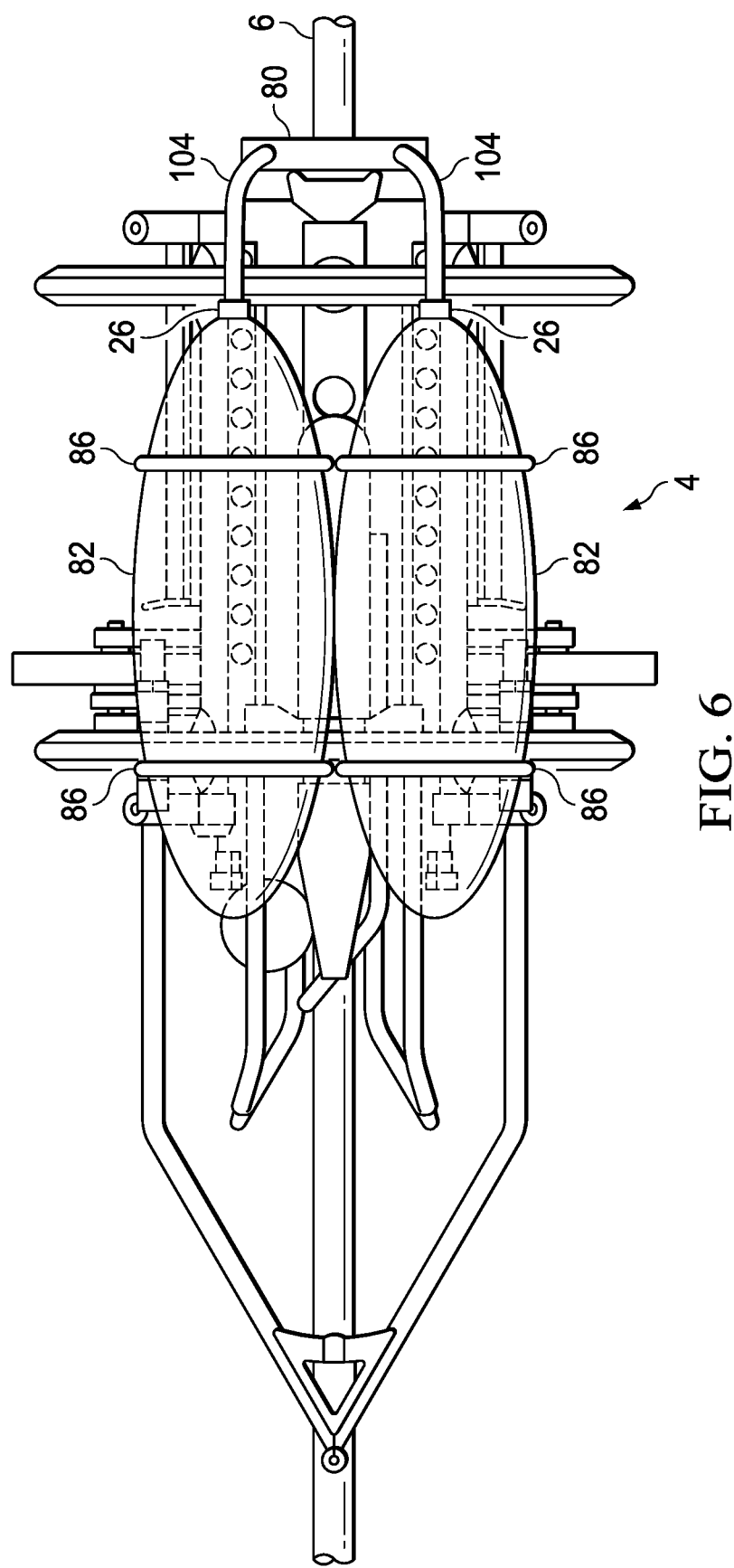
FIG. 6 illustrates an embodiment of multiple tanks to dispense a streamer coating onto a streamer that is submersed in a body of water.

FIG. 6 illustrates a top view of the underwater application system 4 including a plurality of tanks 82 fluidly coupled to the dispensing device 80 via conduits 104, in accordance with some embodiments of the present disclosure. As illustrated, the underwater application system 4 may include a first tank 82 and a second tank 82, each tank configured to contain a mixture of compressed gas and the streamer coating 78 (e.g., shown on FIG. 3). The pressure in the tanks 82 may exceed an ambient water pressure (e.g., indicated by the directional arrow 60, shown on FIG. 2A). In some embodiments, the first tank 82 may contain the compressed gas and the second tank 82 may contain the streamer coating 78, and the contents may mix in the dispensing device 80 before being dispensed onto the streamer 6. In other embodiments, a gas contained in the first tank 82 could be utilized to expel a fluid in the second tank 82.

Figure 7:
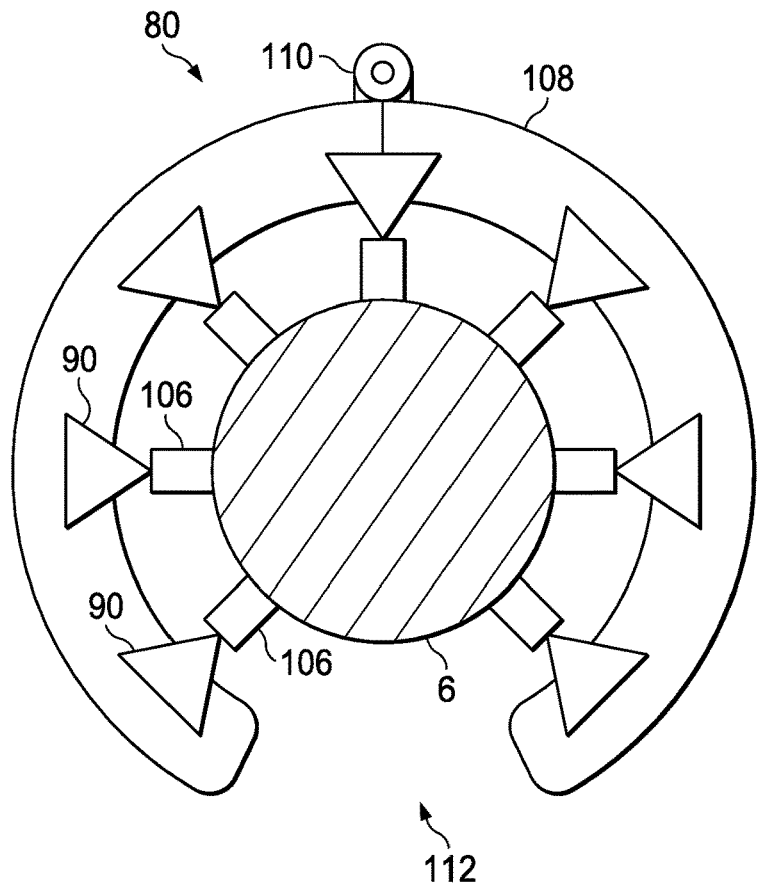
FIG. 7 illustrates an embodiment of a dispensing device of the underwater application system.

FIG. 7 illustrates a cross-sectional view of the dispensing device 80 including brush applicators 106, in accordance with some embodiments of the present disclosure. In some embodiments, the brush applicators 106 may be disposed at least partially over respective nozzles of the plurality of nozzles 90. In some embodiments, the dispensing device 80 may include any device (e.g., roller, sponge, etc.) suitable for applying the streamer coating 78 (e.g., shown on FIG. 3). The streamer coating 78 may be provided to the brush applicators 106 via the plurality of nozzles 90. The brush applicators 106 may be configured to rotate about a central axis of the streamer 6. In some embodiments, two or more brush applicators 106 may be positioned around the circumference of the streamer 6. The brush applicators 106 may contact the streamer 6 as the underwater application system 4 (e.g., shown on FIGS. 4 and 5) moves along the streamer 6. Further, as the underwater application system 4 moves, the streamer 6 may pass through an arrangement of the brush applicators 106 after the SCU 24 (e.g., shown on FIG. 5) has cleaned the streamer 6. The brush applicators 106 may be configured to rotate about the streamer 6 while applying the streamer coating 78 to the streamer 6.

The underwater application system 4 may further include a mounting bracket 108. The dispensing device 80 including the nozzles 90 and/or the brush applicators 106 may be mounted to the mounting bracket 108. The mounting bracket 108 may be coupled to a portion of the SCU 24 along the passage 96 such that the streamer 6 is scraped with the scrapers 92 before being sprayed by the dispensing device 80 as the underwater application system 4 receives the streamer 6 within the passage 96 as the underwater application system 4 moves along the streamer 6, as shown on FIGS. 4 and 5, for example. In some embodiments, the mounting bracket 108 has a circular shape such that the plurality of nozzles 90 mounted to the mounting bracket 108 may form a ring around the streamer 6. The mounting bracket 108 may include a hinge 110 that is configured to open and close the mounting bracket 108 for installation purposes. In some embodiments, the SCU 24 and the underwater application system 4 may be mounted on or movably disposed on or around the streamer 6 after a proximal end of the streamer 6 is coupled to the survey vessel 10 (e.g., as shown on FIG. 1). Further, a distal end of the streamer 6 may be deployed in the water 14 at a distance from the survey vessel 10 such that the mounting bracket 108 having the circular shape may not be threaded over either the proximal or distal end of the streamer 6. As such, the hinge 110 may open the mounting bracket 108 such that the mounting bracket 108 may slide onto the streamer 6 along any portion of the streamer 6. After the mounting bracket 108 slides onto the streamer 6, the hinge 110 may close the mounting bracket 108 such that the mounting bracket 108 is closed around the streamer 6. However, in some embodiments, the mounting bracket 108 may be fixed such that the mounting bracket 108 does not hinge open. Instead, the mounting bracket 108 may have an opening 112 at least as wide as a diameter of the streamer 6 such that the mounting bracket 108 may slide onto the streamer 6 via the opening 112. In such embodiments, coupling the mounting bracket 108 to the SCU 24 may hold the mounting bracket 108 in place (e.g., around the streamer 6) with respect to the streamer 6 during operation.

Figure 8:
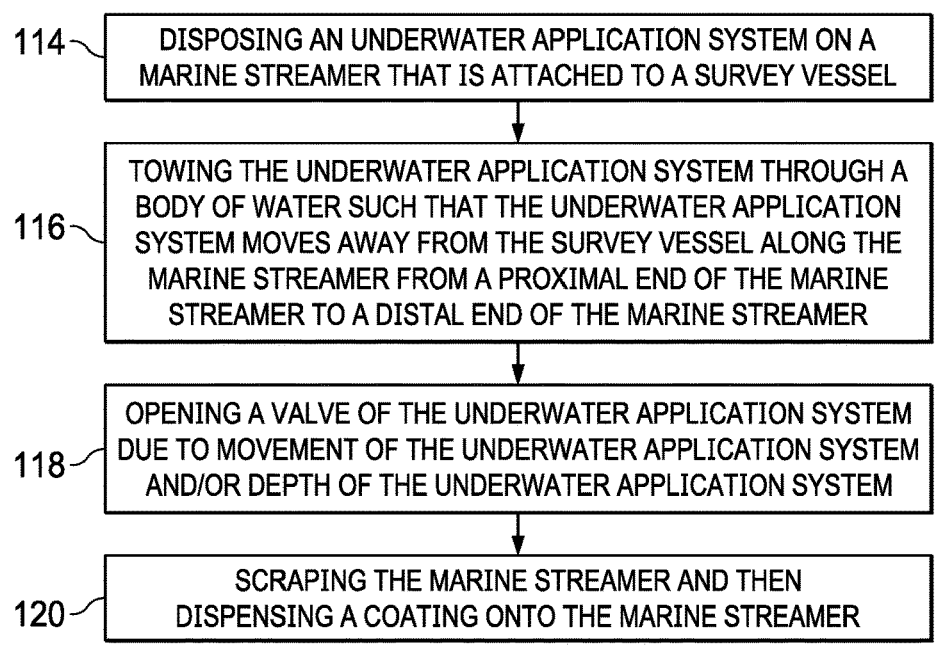
FIG. 8 illustrates a flow chart depicting an operative sequence for the underwater application system, in accordance with an embodiment.

FIG. 8 illustrates an exemplary flow chart depicting an operative sequence of the underwater application system 4 (e.g., shown on FIG. 5), in accordance with some embodiments of the present disclosure. At step 114, in some embodiments, the underwater application system 4 and the SCU 24 may be initially disposed underwater at a proximal end of the streamer 6 or between a rear or stern of the survey vessel 10 and a first geophysical sensor 8, as shown on FIG. 1. At step 116, in some embodiments, the underwater application system 4 and the SCU 24 may move along the streamer 6 through the body of water 14, as the survey vessel 10 tows the streamer 6, as shown on FIG. 1. At step 118, in some embodiments, water pressure may increase above a threshold value, due to a speed and/or direction of the survey vessel 10 and/or a tow depth. The water pressure, upon reaching the threshold limit, may cause the control system 26 to open to dispense the streamer coating 78 onto the streamer 6. At step 120, in some embodiments, the underwater application system 4 and the SCU 24 may traverse the entire length of the streamer 6 scraping and then applying the streamer coating 78 (e.g., shown on FIG. 3) to the streamer 6 until the underwater application system 4 and the SCU 24 reach the distal end of the streamer 6 that is opposite to the proximal end of the streamer 6 that is attached to the survey vessel 10, as shown on FIG. 1, for example.

As the water pressure decreases below the threshold, due to a slower speed and/or a change of direction of the survey vessel 10 and/or a shallower tow depth, the valve 28 may close to prevent application of the streamer coating 78. Therefore, as set forth above, the underwater application system may be activated based on movement, speed, and/or a depth of the underwater application system 4 along the streamer 6. Activating the underwater application system 4 may include actuating the valve 28 of the underwater application system 4. In some embodiments, the valve 28 is configured to open while the underwater application system 4 is moving, and close when the underwater activation system 4 stops moving. In another embodiment, the valve 28 may be configured to remain open after the underwater application system 4 starts moving.

Further, as set forth above in some embodiments, the underwater application system 4 may be coupled to the SCU 24. The SCU 24 may include any suitable device or cleaning elements for removing marine growth from the streamers 6.

In one embodiment, the SCU 24 is configured to remove the marine growth from the streamers 6 using scrapers 92 (e.g., shown on FIG. 5) prior to application of the streamer coating 78 (e.g., shown on FIG. 3). The SCU 24 may be configured to move along a streamer 6 along an axial direction. In some embodiments, the SCU 24 may be configured to rotate freely about the streamer 6.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. An underwater application system, comprising:
a housing adapted for mounting onto a streamer;
a tank coupled to the housing;
a dispensing device coupled to the housing and arranged to direct a streamer coating from the tank onto the streamer passing through the housing;
a fluid connection that places the tank in fluid communication with the dispensing device; and
a valve configured to regulate flow of the streamer coating from the tank to the dispensing device.

2. The underwater application system of claim 1, wherein the tank contains the streamer coating.

3. The underwater application system of claim 2, wherein the tank contains a compressed gas.

4. The underwater application system of claim 2, wherein the streamer coating comprises at least one wax selected from the group consisting of an animal wax, a plant wax, a petroleum wax, a polyethylene wax, and combinations thereof.

5. The underwater application system of claim 2, wherein the streamer coating comprises lanolin wax.

6. The underwater application system of claim 1, wherein the dispensing device comprises a plurality of nozzles configured to spray the streamer coating to apply the streamer coating to the streamer.

7. The underwater application system of claim 6, wherein the plurality of nozzles is positionable around a circumference of the streamer.

8. The underwater application system of claim 7, wherein the dispensing device comprises a mounting bracket configured to support the plurality of nozzles.

9. The underwater application system of claim 8, wherein the mounting bracket comprises a hinge configured to open and close the mounting bracket.

10. The underwater application system of claim 1, wherein the dispensing device comprises a brush applicator, a roller, a sponge, or some combination thereof.

11. The underwater application system of claim 1, wherein the valve is configured to open or close at a predetermined depth in response to hydraulic pressure.

12. The underwater application system of claim 1, wherein the valve is configured to open or close in response to movement of the underwater application system along the streamer.

13. The underwater application system of claim 1, further comprising a plurality of tanks coupled to the housing.

14. The underwater application system of claim 1, further comprising a streamer guide at a first end of the housing for receiving the streamer, wherein the dispensing device is located at a second end of the housing.

15. The underwater application system of claim 14, further comprising a plurality of cleaning elements coupled to the housing and positioned around a circumference of the streamer to engage the streamer.

16. The underwater application system of claim 1, wherein the tank includes a tapered profile.

17. A method comprising:
attaching an underwater application system to a streamer, the underwater application system including a valve, a tank, and a dispensing device arranged to direct a streamer coating from the tank onto the streamer;
running the underwater application system along a length of the streamer in a body of water while the streamer is being towed through the body of water; and
spraying a streamer coating from the underwater application system onto the streamer as the underwater application system is running along the length of the streamer in the body of water, wherein a flow of the streamer coating is regulated from the tank to the dispensing device via the valve.

18. The method of claim 17, wherein the spraying of the streamer coating from the underwater application system comprises spraying a wax onto the streamer.

19. The method of claim 17, wherein the spraying of the streamer coating from the underwater application system comprises spraying a lanolin wax onto the streamer.

20. The method of claim 17, further comprising scraping the streamer to clean the streamer before applying the streamer coating, and wherein the spraying the streamer coating comprises flowing the streamer coating from a pressure vessel through nozzles and then onto the streamer.

21. An underwater application system, comprising:
a housing adapted for mounting onto a streamer;
a tank coupled to the housing;
a dispensing device coupled to the housing and arranged to direct a streamer coating from the tank onto the streamer passing through the housing, wherein the dispensing device comprises a plurality of nozzles configured to spray the streamer coating to apply the streamer coating to the streamer, wherein the plurality of nozzles is positionable around a circumference of the streamer, wherein the dispensing device comprises a mounting bracket configured to support the plurality of nozzles, wherein the mounting bracket comprises a hinge configured to open and close the mounting bracket; and
a fluid connection that places the tank in fluid communication with the dispensing device.

* * * * *